(12) United States Patent
Skulina et al.

(10) Patent No.: US 10,244,100 B2
(45) Date of Patent: Mar. 26, 2019

(54) CONTROL APPARATUS

(71) Applicant: SKOOGMUSIC LTD, Edinburgh Lothian (GB)

(72) Inventors: David John Skulina, Edinburgh (GB); Benjaman Warren Schögler, Edinburgh (GB); Keith Nagle, Edinburgh (GB)

(73) Assignee: SKOOGMUSIC LTD, Edinburgh (GB)

( * ) Notice: Subject to any disclaimer, the term of this patent is extended or adjusted under 35 U.S.C. 154(b) by 0 days.

(21) Appl. No.: 15/718,690

(22) Filed: Sep. 28, 2017

(65) Prior Publication Data

US 2018/0097927 A1 Apr. 5, 2018

(30) Foreign Application Priority Data

Oct. 2, 2016 (GB) .................................. 1616740.5

(51) Int. Cl.
| | |
|---|---|
| *G06F 3/041* | (2006.01) |
| *H04M 1/725* | (2006.01) |
| *G01D 5/14* | (2006.01) |
| *G06F 3/046* | (2006.01) |
| *H04N 5/225* | (2006.01) |

(52) U.S. Cl.
CPC ........ *H04M 1/72575* (2013.01); *G01D 5/145* (2013.01); *G06F 3/046* (2013.01); *H04M 1/7253* (2013.01); *H04M 1/72525* (2013.01); *G06F 3/041* (2013.01); *H04M 2250/52* (2013.01); *H04N 5/225* (2013.01); *H04N 5/2252* (2013.01)

(58) Field of Classification Search
CPC ...................... H04M 1/72575; H04M 1/72525
See application file for complete search history.

(56) References Cited

U.S. PATENT DOCUMENTS

| | | | | |
|---|---|---|---|---|
| 3,575,248 | A | * | 4/1971 | Bell .......................... G01G 3/08 177/163 |
| 2010/0110013 | A1 | | 5/2010 | Li et al. |
| 2011/0117810 | A1 | * | 5/2011 | Morley ..................... A63H 3/02 446/369 |
| 2014/0085271 | A1 | | 3/2014 | Hwang et al. |
| 2015/0279535 | A1 | | 10/2015 | Arrington et al. |
| 2016/0352382 | A1 | * | 12/2016 | Andrus ................ H04B 1/3888 |

FOREIGN PATENT DOCUMENTS

| | | |
|---|---|---|
| GB | 2532013 | 5/2016 |
| WO | 2015177527 | 11/2015 |

* cited by examiner

*Primary Examiner* — Tuan H Nguyen
(74) *Attorney, Agent, or Firm* — Liu & Liu

(57) ABSTRACT

The present invention relates to control apparatus. The control apparatus 10 comprises a resiliently deformable body 12 which defines a narrow hole 22 configured to receive lengthwise or widthwise a mobile device 14 and to hold the mobile device snugly when so received. The mobile device 14 comprises a magnetic field sensor 24. The control apparatus further comprises a magnetic field emitting device 20 disposed in or on the resiliently deformable body 12 whereby, in use, the magnetic field emitting device moves relative to the narrow hole 22 and hence the magnetic field sensor 24 of the mobile device upon deformation of the resiliently deformable body.

20 Claims, 4 Drawing Sheets

CONTROL APPARATUS

FIELD OF THE INVENTION

The present invention relates to control apparatus which is operative in response to manipulation by a user.

BACKGROUND ART

Control apparatus which is operative in response to manipulation by a user is known from the like of WO 2015/177527 A1. WO 2015/177527 A1 discloses control apparatus comprising a resiliently deformable body. The control apparatus is configured to generate a control signal upon deformation of the resiliently deformable body by a user.

The present inventors have devised an alternative form of control apparatus which is operative in dependence on deformation of a resiliently deformable body by a user. It is an object for the present invention to provide an alternative form of control apparatus comprising a resiliently deformable body.

STATEMENT OF INVENTION

According to a first aspect of the present invention there is provided control apparatus comprising:
 a resiliently deformable body which defines a narrow hole configured to receive lengthwise or widthwise a mobile device comprising a magnetic field sensor and to hold the mobile device snugly when so received; and
 a magnetic field emitting device disposed in or on the resiliently deformable body whereby, in use, the magnetic field emitting device moves relative to the hole and hence the magnetic field sensor of the mobile device upon deformation of the resiliently deformable body.

The control apparatus of the present invention comprises a resiliently deformable body which defines a narrow hole configured to receive lengthwise or widthwise a mobile device comprising a magnetic field sensor, such as a smartphone comprising a Hall effect sensor, and to hold the mobile device snugly when so received. The control apparatus further comprises a magnetic field emitting device disposed in or on the resiliently deformable body. In use, the magnetic field emitting device moves relative to the hole and hence the magnetic field sensor of the mobile device upon deformation of the resiliently deformable body, such as deformation caused by user manipulation.

The mobile device may be configured, such as by way of an App running on the mobile device, to sense relative movement of the magnetic field emitting device and the magnetic field sensor. More specifically the mobile device may be configured to sense movement of the magnetic field emitting device relative to the magnetic field sensor. The control apparatus may therefore comprise the mobile device. Depending on the form of the magnetic field sensor the mobile device may be configured to sense movement in three mutually orthogonal axes. Alternatively or in addition and depending on the form of the magnetic field sensor, the mobile device may be configured to sense rotation around three mutually orthogonal axes. Alternatively or in addition, the mobile device may be configured to sense change in orientation of the resiliently deformable body. Furthermore operation of the mobile device in dependence on sensed relative movement of the magnetic field emitting device and the magnetic field sensor may be further in dependence on sensed change in orientation of the resiliently deformable body. More specifically the mobile device may be configured such that it is operative, for example in respect of generation of a control signal or emission of an audible signal, solely in dependence on deformation of the resiliently deformable body and whereby change in orientation of the resiliently deformable body is of substantially no effect.

The mobile device may be configured to generate a control signal in dependence on sensing of relative movement of the magnetic field emitting device and the magnetic field sensor. As described further below, the control signal may be used to control controllable apparatus. Alternatively or in addition the mobile device may be configured, such as by way of an App running on the mobile device, to respond in dependence on sensing of relative movement of the magnetic field emitting device and the magnetic field sensor. More specifically the mobile device may be configured to provide a user perceptible output in dependence on sensing of relative movement of the magnetic field emitting device and the magnetic field sensor. For example, the mobile device may be configured to generate sound or to provide a visible output on a display comprised in the mobile device. Alternatively or in addition, the mobile device may be controlled in dependence on sensing of relative movement of the magnetic field emitting device and the magnetic field sensor. More specifically an operative part of the mobile device, such as a loudspeaker, display or telephony function, may be controlled. For example, the volume of the loudspeaker may be changed. By way of another example, the display brightness may be changed. By way of a further example, a call may be taken or terminated by control of the telephony function.

The mobile device may be configured to change a power status of the mobile device in dependence on at least one of: sensing of relative movement of the magnetic field emitting device and the magnetic field sensor; bodily movement, such as lifting, of the resiliently deformable body with the mobile device in situ. The power status may be changed between the mobile device being powered up and the mobile device being powered down. Alternatively or in addition the mobile device may be configured to enter a power down mode when the resiliently deformable body with the mobile device in situ is at least one of not moved bodily and not deformed for a predetermined time.

As specified above, the resiliently deformable body defines a narrow hole configured to receive a mobile device lengthwise or widthwise. The hole may therefore be defined by substantially rectilinear surfaces of the resiliently deformable body which extend from an aperture defined in a surface of the resiliently deformable body. The depth of the mobile device may be small in comparison to each of the width and length of the mobile device whereby the mobile device is thin. The aperture defined in the surface of the resiliently deformable body may therefore have the form of a slot. A cross section of the hole may be substantially rectangular. The hole may be a blind hole. The hole may therefore be of predetermined depth whereby a portion of the mobile device may be received in the hole, such as about half of the mobile device. A part of the mobile device comprising a loudspeaker may therefore be outside the resiliently deformable body. Alternatively or in addition at least a part of a display comprised in the mobile device may be outside the resiliently deformable body.

As specified above, the hole is configured to hold the mobile device snugly. A dimension of the hole, such as at least one of height and width, may be sufficiently large so as to allow the mobile device to be admitted and yet sufficiently small, at least in part, that the resiliently deformable body defining the hole bears against the outside of the mobile device to thereby provide for mechanical coupling between the mobile device and the resiliently deformable body. Where the mobile device is configured to vibrate, the mobile device may be configured, such as by way of an App, to vibrate in dependence on sensing of relative movement of the magnetic field emitting device and the magnetic field sensor. Vibration of the mobile device may be coupled from the mobile device to the resiliently deformable body whereby the resiliently deformable body provides haptic feedback to the user in dependence on user manipulation of the resiliently deformable body.

The mobile device may be configured, such as by way of an App running on the mobile device, to detect a change in location of the magnetic field emitting device. A user may, for example, rest his or her hand on the resiliently deformable body such that the resiliently deformable body is deformed whereby the location of the magnetic field emitting device is changed from when there is no deformation of the resiliently deformable body. The mobile device may therefore be configured to set a reference location for the magnetic field emitting device to a present location for the magnetic field emitting device. More specifically the reference location for the magnetic field emitting device may be set to the present location for the magnetic field emitting device when the present location is substantially unchanging for a predetermined time. The mobile device may be configured to operate in dependence on subsequent movement of the magnetic field emitting device from the reference location. For example, the mobile device may be operative to generate a control signal or to emit a sound in dependence on subsequent movement of the magnetic field emitting device.

The resiliently deformable body may define a surface engaging surface which may be planar. The resiliently deformable body may be thus configured to rest on a planar surface such as a tabletop. The resiliently deformable body may define an upper surface. The upper surface may be oppositely directed to the surface engaging surface. The upper surface may be uneven whereby it defines a protrusion, such as in the form of a button. The hole may extend from a side of the resiliently deformable body. When the mobile device is received in the hole, the mobile device may extend generally and more specifically substantially parallel to the surface engaging surface and hence the surface on which the resiliently deformable body rests. The resiliently deformable body may define a polyhedron. The resiliently deformable body may be generally cuboidal in form. More specifically a height of the resiliently deformable body may be significantly less than either a width or length of the resiliently deformable body whereby the resiliently deformable body is thin. The resiliently deformable body may be of a size and shape so as to provide for ease of manipulation and hence control by a person of impaired dexterity.

The resiliently deformable body may be configured to accommodate an electrical cable, such as an electrical power cable, which is connected to the mobile device when received in the hole. The resiliently deformable body may define a conduit for accommodating the electrical cable. The mobile device may thus be charged when in situ.

The resiliently deformable body may be translucent at least in part. Light emitted by a display comprised in the mobile device may thus be seen through the resiliently deformable body by a user.

In one embodiment, the magnetic field emitting device may comprise a permanent magnet. In another embodiment, the magnetic field emitting device may comprise an electromagnet. More specifically the resiliently deformable body may be configured to provide electrical power to the electromagnet from an external source.

For example, the resiliently deformable body may comprise an electrical connector for receiving electrical power from an electrical mains transformer. Alternatively or in addition, the control apparatus may be configured to provide electrical power to the electromagnet from the mobile device, such as by way of a USB cable. The magnetic field sensor may comprise a Hall effect sensor.

The resiliently deformable body may comprise a mass of resilient material. The mass of resilient material may comprise gaseous voids. The mass of resilient material may comprise a polymer such as polyurethane which may be in the form of a foam, such as from Urofoam Ltd. of Duddon Road, Askam-in-Furness, Cumbria LA16 7AN, United Kingdom. The resiliently deformable body may be unitary. The resiliently deformable body may, for example, be formed from one mass of resilient material.

The resiliently deformable body may be configured to provide for interaction with a touchscreen comprised in the mobile device in dependence on deformation of the resiliently deformable body. More specifically a part of the resiliently deformable body which defines a surface of the hole may be configured to provide for interaction with the touchscreen. The resiliently deformable body may comprise a metallic arrangement, such as a foil pattern, on a surface thereof. Alternatively or in addition, resiliently deformable body may comprise an electrically conductive polymer which defines a surface thereof.

The resiliently deformable body may comprise a rigid arrangement to which the magnetic field emitting device is attached, the rigid arrangement being disposed to hold the magnetic field emitting device at a predetermined location in or on the resiliently deformable body. The rigid arrangement may be attached to the magnet and more specifically towards an end of the rigid arrangement. The rigid arrangement may extend in at least two orthogonal directions and perhaps three mutually orthogonal directions inside the resiliently deformable body. The rigid arrangement may be elongate. The rigid arrangement may define a non-linear path. The rigid arrangement may extend across at least part of the resiliently deformable body whereby a user may move the magnetic field emitting device by deformation of the resiliently deformable body near part of the rigid arrangement spaced from the magnetic field emitting device. The resiliently deformable body may be configured such that the rigid arrangement pivots about a fulcrum spaced apart along the rigid arrangement between the two opposite ends of the rigid arrangement. The resiliently deformable body may be configured for rotation of the rigid arrangement about the fulcrum by way of mechanical engagement between the resiliently deformable body and the part of the rigid arrangement constituting the fulcrum. Mechanical engagement between the resiliently deformable body and the part of the rigid arrangement constituting the fulcrum may be by way of a structure comprised in the rigid arrangement. The structure may, for example, comprise a bulbous portion about which the rigid arrangement is liable to rotate when and end of the rigid arrangement is moved within the resiliently deformable body. Alternatively or in addition, mechanical engagement between the resiliently deformable body and the part of the rigid arrangement constituting the fulcrum may be by way of a fastening arrangement. The fastening arrangement may, for example, comprise stitching which mechanically couples the part of the rigid arrangement constituting the fulcrum to the resiliently deformable body.

The resiliently deformable body may define plural narrow holes with each narrow hole being configured to receive lengthwise or widthwise a respective mobile device comprising a magnetic field sensor and to hold the mobile device snugly when so received.

The control apparatus may further comprise controllable apparatus. The mobile device and the controllable apparatus may be configured to form a communication link between them and more specifically wireless communication link and more particularly radio communication link between them. For example, the mobile device and the controllable apparatus may be in communication with each other by way of a wireless communication channel in accordance with the Bluetooth Low Energy (BLE) protocol. The control apparatus may be configured such that deformation of the resiliently deformable body is operative to control the controllable apparatus by way of the communication link. The controllable apparatus may comprise at least one of: a further mobile device such as a tablet device; a home entertainment system; and a home automation system.

Further embodiments of the first aspect of the present invention may comprise one or more features of any other aspect of the present invention.

The present inventors have appreciated the feature of controlling controllable apparatus by way of the resiliently deformable body to be of wider applicability than hitherto described. Therefore and according to a second aspect of the present invention there is provided a control arrangement comprising:
  a mobile device comprising a magnetic field sensor;
  a resiliently deformable body which comprises a magnetic field emitting device disposed therein or thereon, the resiliently deformable body being configured to receive the mobile device, the mobile device being configured to sense movement of the magnetic field emitting device in relation to the magnetic field sensor in dependence on deformation of the resiliently deformable body, generate a control signal in dependence thereon and transmit the control signal therefrom; and
  controllable apparatus configured to receive the control signal from the mobile device, the controllable apparatus being configured to be controlled in dependence on the received control signal.

According to the present aspect of the invention the control arrangement comprises a mobile device, such as a smartphone, comprising a magnetic field sensor and a resiliently deformable body which comprises a magnetic field emitting device, such as a permanent magnet, disposed therein or thereon, the resiliently deformable body being configured to receive and more specifically mechanically engage with the mobile device. The mobile device is configured to sense movement of the magnetic field emitting device in relation to the magnetic field sensor in dependence on deformation of the resiliently deformable body, generate a control signal in dependence thereon and transmit the control signal therefrom. The control arrangement further comprises controllable apparatus, such as a tablet computer, configured to receive the control signal from the mobile device, the controllable apparatus being configured to be controlled in dependence on the received control signal.

The resiliently deformable body may define a recess which is configured to receive the mobile device at least in part. More specifically the resiliently deformable body may define a hole configured to receive the mobile device at least in part. The hole may be narrow and otherwise configured to receive the mobile device lengthwise or widthwise.

Further embodiments of the second aspect of the present invention may comprise one or more features of the first aspect of the present invention.

The present inventors have appreciated the features of a resiliently deformable body having a narrow hole configured to receive a mobile device comprising a magnetic field sensor and a magnetic field emitting device disposed in or on the resiliently deformable body to be of wider applicability than hitherto described. Therefore and according to a third aspect of the present invention there is provided a toy comprising:
  a resiliently deformable body which defines a narrow hole configured to receive lengthwise or widthwise a mobile device comprising a magnetic field sensor and to hold the mobile device snugly when so received; and
  a magnetic field emitting device disposed in or on the resiliently deformable body whereby, in use, the magnetic field emitting device moves relative to the hole and hence the magnetic field sensor of the mobile device upon deformation of the resiliently deformable body.

According to the present aspect of the invention the toy comprises a resiliently deformable body which defines a narrow hole configured to receive lengthwise or widthwise a mobile device, such as a smartphone or tablet computer, comprising a magnetic field sensor and to hold the mobile device snugly when so received. The toy further comprises a magnetic field emitting device, such as a permanent magnet, disposed in or on the resiliently deformable body whereby, in use, the magnetic field emitting device moves relative to the hole and hence the magnetic field sensor of the mobile device upon deformation of the resiliently deformable body. The toy may further comprise the mobile device.

The hole defined by the resiliently deformable body may extend downwards into the resiliently deformable body from an upper portion of the resiliently deformable body. When received in the hole, the mobile device may extend into the hole along its length or width in a vertical direction. The resiliently deformable body may be configured such that the hole extends at an angle, such as 20 degrees from vertical.

The resiliently deformable body may define an aperture in a surface thereof which is disposed so as to provide for visibility from outside the toy of at least a part of a display of the mobile device when the mobile device is received in the hole. The aperture may be oriented substantially orthogonally to the hole. The aperture may therefore be present at a side of the resiliently deformable body when the hole extends from an upper portion of the resiliently deformable body. The aperture may open into the hole and more specifically into a side of the hole. The aperture may be of a dimension such that each of an upper end and a lower end of the mobile device is held between opposing walls of the hole when the mobile device is received in the hole.

The resiliently deformable body may define a further aperture in a surface thereof which is disposed so as to allow for use of a camera, such as a front or rear camera, comprised in the mobile device. The resiliently deformable body may comprise an aperture cover which is movable between a first position in which the further aperture is covered and a second position in which the further aperture is uncovered.

The toy may comprise a cover which is configured to fit over the resiliently deformable body. The cover may comprise features such as fur, ears, horns, arms, legs and a tail whereby the toy is given a particular character. The resiliently deformable body may be of a shape to give the toy a general character. The general character provided by the shape of the resiliently deformable body may be made more particular by way of the cover. The cover may have a first set of features on one side and a second set of features on the other side and be reversible whereby the set of features visible on the toy may be changed.

The cover may comprise an identification device and the mobile device may be configured to read the identification device whereby the cover may be identified and operation of the mobile device may be changed in dependence on the identified cover. More specifically at least one of a display of the mobile device and sounds emitted by the mobile device may be changed in dependence on the identified cover. Operation of the mobile device may thus be adapted in accordance with the cover fitted to the resiliently deformable body.

The identification device may comprise at least one of a wireless device, such as an RFID tag, and an optically read device, such as a label of a particular colour, a barcode or a QR code. The mobile device may be configured accordingly. More specifically where the identification device comprises a wireless device, the mobile device may comprise a wireless reader, such as a RFID reader. Where the identification device comprises an optically read device, the mobile device may comprise a camera and may be configured to acquire an image of the optically read device and in dependence thereon identify the cover by, for example, comparing the acquired image with a library of stored images which each correspond to a respective different cover.

The toy may comprise plural different covers whereby a character of the toy is changeable. Each of the plural different covers may comprise an identification device whereby the cover may be identified by the mobile device.

As described above with reference to the first aspect of the present invention, deformation of the resiliently deformable body may cause movement of the magnetic field emitting device in relation to the magnetic field sensor of the mobile device with such movement being sensed by the magnetic field sensor. The mobile device may be operative to respond to such sensed movement by, for example, changing what is displayed on the display of the mobile device or emitting a sound by way of a loudspeaker comprised in the mobile device. According to the present aspect, the mobile device may be configured, such as by way of an App running on the mobile device, to respond to sensed movement in accordance with a character of the toy. For example, where the toy has the character of an animal the mobile device may be operative to display features of the animal such as eyes and mouth and to change how such features of the animal are displayed in dependence on deformation of the resiliently deformable body. By way of another example, where the toy has the character of an animal the mobile device may be operative to emit sounds appropriate to the animal in dependence on deformation of the resiliently deformable body.

The mobile device may be configured to detect at least one predetermined deformation and to respond accordingly. More specifically the mobile device may be configured to detect a predetermined deformation which is repeated and to respond accordingly. The predetermined deformation may be characterised in respect of the like of extent of deformation and direction of deformation. The like of stroking of the toy may thus be detected. The mobile device may be configured to at least one of change what is displayed on a display of the mobile device and emit a sound in dependence on detection of a predetermined deformation. For example, when stroking of the toy is detected the mobile device may be operative to change an expression of a face displayed on the display to reflect happiness and to emit a purring sound.

Further embodiments of the third aspect of the present invention may comprise one or more features of the first aspect or second aspect of the present invention.

According to a further aspect of the present invention there is provided apparatus comprising: a resiliently deformable body which has a profile configured to receive a mobile device comprising a magnetic field sensor; and a magnetic field emitting device disposed in or on the resiliently deformable body whereby, in use, the magnetic field emitting device and the profile move relative to each other upon deformation of the resiliently deformable body. Embodiments of the further aspect of the present invention may comprise one or more features of any other aspect of the present invention.

BRIEF DESCRIPTION OF DRAWINGS

Further features and advantages of the present invention will become apparent from the following specific description, which is given by way of example only and with reference to the accompanying drawings, in which.

DESCRIPTION OF EMBODIMENTS

Figure 1:
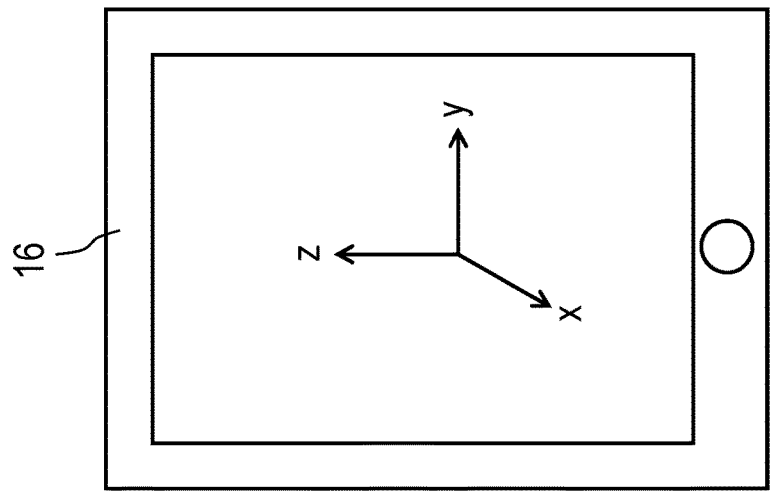
FIG. 1 shows a control arrangement according to an embodiment of the present invention.
Figure 1:
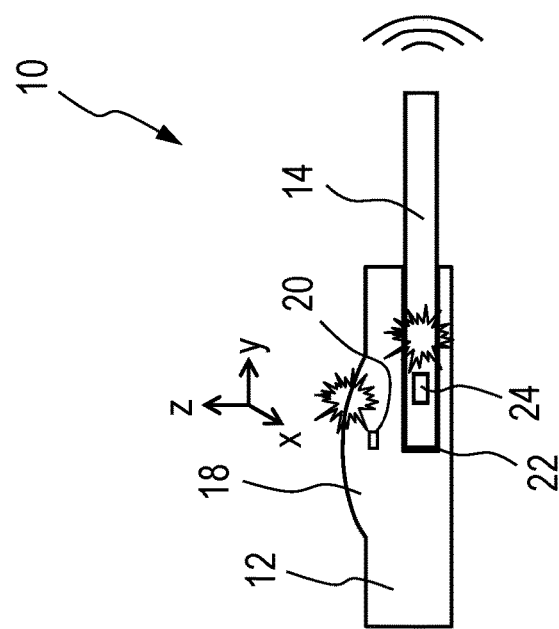

A control arrangement 10 according to an embodiment of the present invention is shown in FIG. 1. The control arrangement 10 comprises a resiliently deformable body 12, a smartphone 14 (which constitutes a mobile device) and a tablet computer 16 (which constitutes controllable apparatus). The resiliently deformable body 12 and the smartphone 14 together constitute control apparatus.

The resiliently deformable body 12 is a unitary mass of foam from Urofoam Ltd. of Duddon Road, Askam-in-Furness, Cumbria LA16 7AN, United Kingdom. The resiliently deformable body 12 is generally cuboidal in form with a part spherical protrusion 18 extending from its upper surface. A height of the resiliently deformable body is significantly less than either a width or length of the resiliently deformable body whereby the resiliently deformable body is thin. The lower surface of the resiliently deformable body 12 is planar whereby the resiliently deformable body can be positioned on a planar surface such as a tabletop. The resiliently deformable body and the protrusion 18 in particular are of a size and shape so as to provide for ease of manipulation and hence control by a person of impaired dexterity. Although not shown in FIG. 1, the resiliently deformable body defines a conduit for accommodating an electrical power cable, which is connected to the smartphone 14 when received in the resiliently deformable body as shown in FIG. 1. The smartphone 14 may thus be charged when in situ. A part of the resiliently deformable body 12 above the smartphone 14 is translucent at least in part. Light emitted by a display of the smartphone 14 may thus be seen through the resiliently deformable body. A permanent magnet 20 (which constitutes a magnetic field emitting device) is present within the resiliently deformable body 12 below the protrusion 18. In another form, an electromagnet is present instead of the permanent magnet 20. In this other form, the resiliently deformable body is configured to provide electrical power to the electromagnet from an external source by way of an electrical connector for receiving electrical power from an electrical mains transformer. Alternatively electrical power is provided to the electromagnet from the smartphone by way of a USB cable.

The resiliently deformable body 12 defines a narrow blind hole 22 which extends from an aperture in a side of the resiliently deformable body. The hole is defined by substantially rectilinear surfaces of the resiliently deformable body which extend from the aperture in the side of the resiliently deformable body whereby the hole is substantially rectangular in cross section. The hole 22 is of dimensions such that the smartphone 14 is received lengthwise, as shown in FIG. 1, or widthwise and held snugly by the resiliently deformable body when so received. The depth of the hole is such that about half of the smartphone 14 is received in the hole. As can be seen from FIG. 1, when the smartphone 14 is received in the hole 22 the smartphone 14 extends substantially parallel to the surface on which the resiliently deformable body 12 rests. Although not evident from FIG. 1, the upper side of the hole 22 which abuts against the display of the smartphone 14 has a metal foil pattern printed thereon. In accordance with conventional design the display of the smartphone 14 also functions as a touchscreen. Deformation of the resiliently deformable body above the smartphone 14 causes the metal foil pattern to be urged against the touchscreen whereby indirect interaction with the touchscreen can be achieved by a user manipulating the resiliently deformable body. In another form, the upper side of the hole 22 which abuts against the display of the smartphone 14 is defined by electrically conductive resilient polymer. The electrically conductive resilient polymer is LD4011 electrostatic conductive foam from Teknis Limited of Unit 5, Valley Farm Estate, Station Road, Meldreth SG8 6JP, United Kingdom. The electrically conductive resilient polymer is operative in the same fashion as the metal foil pattern to provide for indirect interaction with the touchscreen.

The smartphone 14 is of conventional form and function and comprises, amongst other things, a display, a Hall effect sensor 24, an actuator that causes the smartphone 14 to vibrate and a wireless transceiver operative in accordance with the Bluetooth Low Energy (BLE) protocol. The tablet computer 16 also comprises a wireless transceiver operative in accordance with the BLE protocol whereby the smartphone 14 and the tablet computer 16 are in wireless communication with each other.

In use, a user manipulates the resiliently deformable body and thereby deforms the resiliently deformable body. Deformation of the resiliently deformable body moves the permanent magnet 20 relative to the Hall effect sensor 24. The smartphone 14 is configured by way of an App running on the smartphone 14 to sense movement of the permanent magnet 20 relative to the Hall effect sensor 24. The smartphone 14 is operative to sense movement of the permanent magnet 20 in three mutually orthogonal directions and around three mutually orthogonal axes. Furthermore the smartphone 14 is configured to sense change in orientation of the resiliently deformable body with the smartphone 14 in situ by way of the Hall effect sensor 24 with reference to magnetic north. The smartphone 14 is then operative to cancel the effect of change in orientation of the resiliently deformable body with the smartphone 14 in situ whereby the smartphone responds only to deformation of the resiliently deformable body.

The smartphone 14 is configured to generate control signals in dependence on sensing of movement of the permanent magnet 20 relative to the Hall effect sensor 24 and to wirelessly convey these control signals to the tablet computer 16. The tablet computer 16 is controlled in dependence on the received control signals such as in respect of software running on the tablet computer. In addition, the smartphone 14 itself is controlled in dependence on sensing of movement of the permanent magnet 20 relative to the Hall effect sensor 24. Examples of control of the smartphone 14 include generating sound from a loudspeaker of the smartphone or providing a visible output on the display of the smartphone. By way of further examples, operative parts of the smartphone, such as a loudspeaker, display or telephony function, are controlled. Where the loudspeaker is controlled the volume of the loudspeaker may be changed by manipulation of the resiliently deformable body. Where the display is controlled the display brightness may be changed by manipulation of the resiliently deformable body. Where a telephony function is controlled a call may be taken or terminated by manipulation of the resiliently deformable body. The smartphone 14 is further configured to operate the actuator that causes the smartphone to vibrate in dependence on manipulation of the resiliently deformable body 12. As mentioned above, the smartphone 14 is a snug fit in the hole 22 whereby the sides of the hole bear against the outside of the smartphone to thereby provide for mechanical coupling between the smartphone and the resiliently deformable body 12. Vibration of the smartphone 14 is therefore coupled to the resiliently deformable body to provide haptic feedback to the user.

The smartphone 14 is yet further configured to change its power mode in dependence on at least one of: sensing of movement of the permanent magnet 20 relative to the Hall effect sensor 24; and bodily movement, such as lifting, of the resiliently deformable body 12 with the smartphone in situ. The power mode is changed between the smartphone being powered up and the smartphone being powered down. Furthermore the smartphone 14 is configured to enter a power down mode when the resiliently deformable body with the smartphone in situ is for a predetermined time at least one of not moved bodily and not deformed. The smartphone 14 is yet further configured by way of the App to detect when the location of the permanent magnet 20 is changed from when there is no deformation of the resiliently deformable body and remains in the changed location for more than a predetermined time. The smartphone 14 is then operative to set the changed location as a reference location with sensing of movement of the permanent magnet 20 being with reference to the reference location. The smartphone 14 is thus operative to take account of deformation of the resiliently deformable body which is not intended to effect a control action, such as a user resting his or her wrist on an edge of the resiliently deformable body.

In another form of controllable arrangement, the resiliently deformable body defines plural narrow holes with each narrow hole being configured to receive lengthwise or widthwise a respective smartphone comprising a Hall effect sensor and to hold the smartphone snugly when so received. The resiliently deformable body comprises one permanent magnet therein with movement thereof being sensed by each Hall effect sensor. Alternatively, the resiliently deformable body comprises a permanent magnet for each smartphone with each permanent magnet being disposed within the resiliently deformable body to provide for optimal sensing of relative movement within each pair of permanent magnets and Hall effect sensors.

Figure 2A:
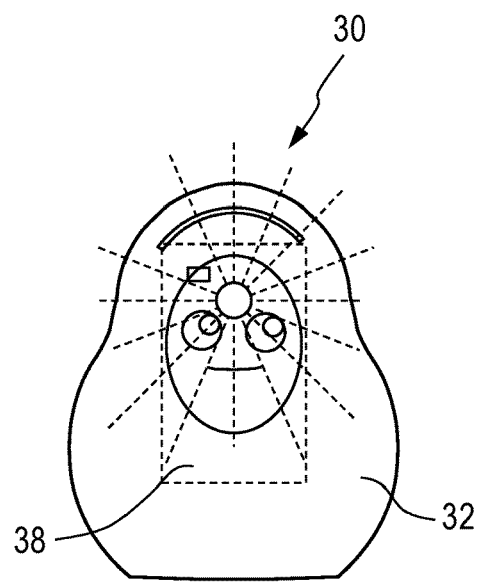
FIGS. 2A and 2B show front and side views respectively of a toy according to a first embodiment of an aspect of the present invention.
Figure 2B:
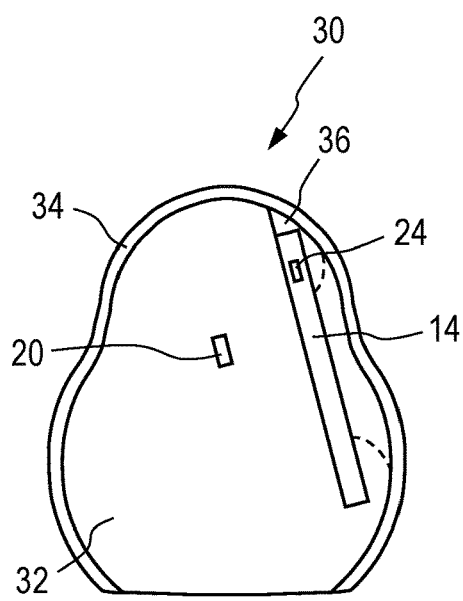

Front and side views respectively of a toy 30 according to a first embodiment of an aspect of the present invention are shown in FIGS. 2A and 2B. The toy of FIGS. 2A and 2B is of the same general form and function as the controllable arrangement 10 of FIG. 1 in respect of the resiliently deformable body and the smartphone but lacks the tablet computer 16 of the controllable arrangement 10 of FIG. 1. Components of the toy 30 in common with the controllable arrangement 10 of FIG. 1 are designated with like reference numerals.

The smartphone 14 of the toy 30 is of the same form as the smartphone 14 of the controllable arrangement 10. The resiliently deformable body 32 of the toy 30 is of a shape to give the toy the general form of a fanciful animal. The toy comprises a cover 34 which is configured to fit closely over the resiliently deformable body 32. The cover 34 comprises features such as fur, ears, horns, arms, legs and a tail whereby the toy is given a more particular character. The cover 34 has a first set of features on one side and a second set of features on the other side and is reversible whereby the set of features visible on the toy 30 may be changed. The resiliently deformable body 32 of the toy 30 defines a narrow hole 36 which extends downwards at small angle to vertical into the resiliently deformable body from an upper portion of the resiliently deformable body. The narrow hole 36 of the toy 30 is of the same cross section as but of different orientation to the narrow hole 22 of the controllable arrangement 10. The narrow hole 36 therefore receives the smartphone 14 lengthwise. The narrow hole 36 of the toy 30 is of greater length than the narrow hole 22 of the controllable arrangement 10 whereby all of the smartphone 14 is received in the hole.

The resiliently deformable body 32 of the toy 30 defines an aperture 38 in a side surface thereof which is oriented substantially orthogonally to the narrow hole 36 and such that the aperture opens into a side of the narrow hole. The aperture 38 is of a height such that each of an upper end and a lower end of the smartphone 14 is held between opposing walls of the hole when the smartphone 14 is received in the narrow hole 36. The aperture 38 is disposed along the narrow hole 36 such that the display of the smartphone 14 can be seen through the aperture. Although not shown in FIGS. 2A and 2B, the resiliently deformable body 32 defines a further aperture in a surface thereof which is disposed so as to allow for use of a camera, such as a front or rear camera, comprised in the smartphone 14 when the smartphone is received in the resiliently deformable body.

As described above with reference to FIG. 1, deformation of the resiliently deformable body 32 causes movement of the permanent magnet 20 in relation to the Hall effect sensor 24 of the smartphone 14 with such movement being sensed by the Hall effect sensor. The smartphone 14 is operative by way of an App running on the smartphone 14 to respond to such sensed movement by changing what is displayed on the display of the smartphone and emitting a sound by way of the loudspeaker of the smartphone. More specifically the smartphone is operative to display features of the fanciful animal such as eyes and mouth and to change how such features are displayed in dependence on deformation of the resiliently deformable body. Furthermore the smartphone 14 is operative to emit sounds appropriate to the fanciful animal in dependence on deformation of the resiliently deformable body. The smartphone 14 is further configured to detect repeated predetermined deformations and to respond accordingly with the predetermined deformations being characterised in respect of the like of extent of deformation and direction of deformation. The like of stroking of the toy 30 is thus detected. The smartphone 14 is configured to change what is displayed on the display of the smartphone and emit a sound in dependence on detection of the repeated predetermined deformations. For example, when stroking of the toy is detected the smartphone 14 is operative to change an expression of a face displayed on the display to reflect happiness and to emit a purring sound.

As mentioned above, the cover 34 is reversible whereby the character of the fanciful animal may be changed. No two fanciful animals have the same facial features provided by way of the display of the smartphone 14 or emit the same sounds by way of the loudspeaker of the smartphone. Each side of the cover therefore comprises a different QR code. An image of the QR code on the side of the cover 34 to be visible when the cover is fitted is acquired by way of the camera comprised in the smartphone 14. The smartphone is then operative to compare the acquired QR code with a library of stored QR codes which each correspond to a different fanciful animal to thereby identify facial features to be displayed and sounds to be emitted by the smartphone which correspond to the side of the cover which is visible when the cover is fitted to the resiliently deformable body. The toy comprises further different reversible covers whereby the toy has the form of one of many different fanciful animals. Each of the further different reversible covers has a QR code on each side whereby each side of each cover is identifiable by the smartphone 14 and the smartphone is operative to respond accordingly.

Figure 3A:
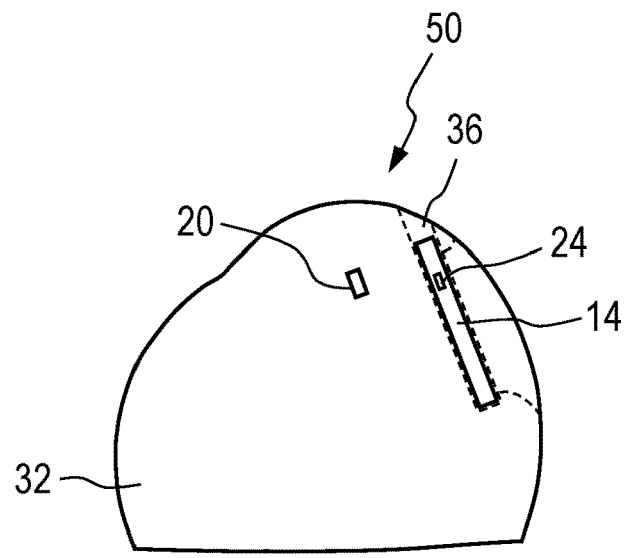
FIGS. 3A and 3B show front and side views respectively of a toy according to a second embodiment of an aspect of the present invention.
Figure 3B:
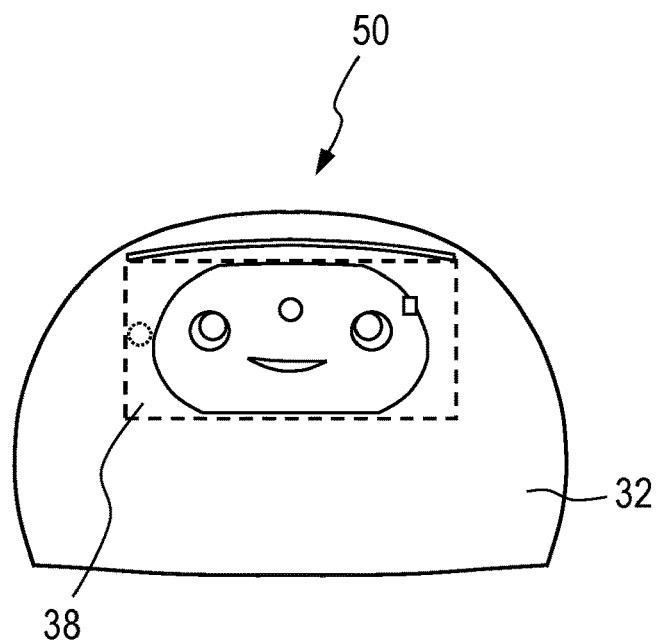

Front and side views respectively of a toy 50 according to a second embodiment of an aspect of the present invention are shown in FIGS. 3A and 3B. The toy 50 according to the second embodiment is of the same form and function as the toy 30 according to the first embodiment except as described below. Components common to the toys according to the first and second embodiments are designated by like reference numerals. The size and shape of the resiliently deformable body 32 and of the narrow hole 36 defined therein of the second embodiment are changed from the first embodiment whereby the smartphone 14 is received widthwise in the narrow hole. Otherwise the form and function of the second embodiment are the same as the first embodiment.

Figure 4A:
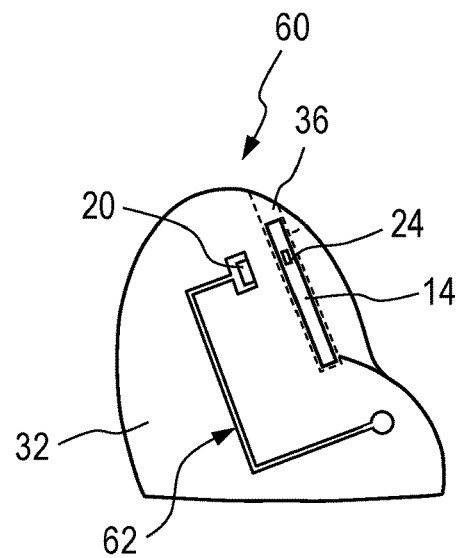
FIGS. 4A and 4B show front and side views respectively of a toy according to a third embodiment of an aspect of the present invention.
Figure 4B:
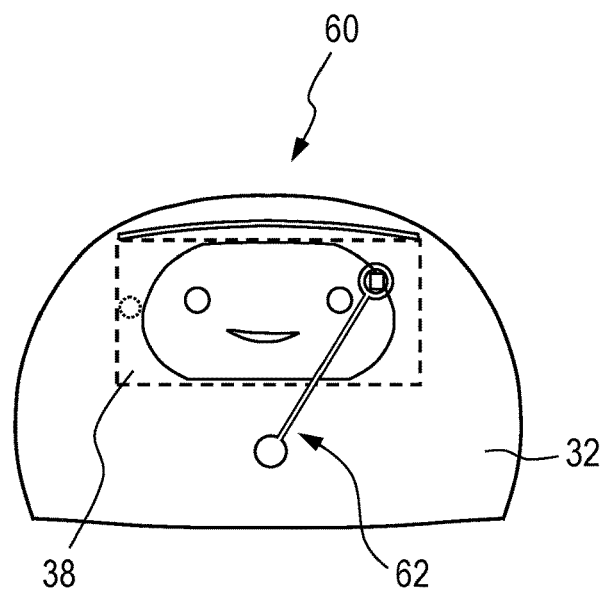

Front and side views respectively of a toy 60 according to a third embodiment of an aspect of the present invention are shown in FIGS. 4A and 4B. The toy 60 according to the third embodiment is of the same form and function as the toy 50 according to the second embodiment except as described below. Components common to the toys according to the second and third embodiments are designated by like reference numerals. The toy 60 according to the third embodiment further comprises an elongate rigid arrangement 62 which is attached at one end to the permanent magnet 20. The rigid arrangement 62 is non linear and comprises a middle section from opposite ends of which first and second end sections extend in the same direction. The second end section is about double the length of the first end section. The distal end of the first end section is attached to the permanent magnet. The distal end of the second end section forms a bulbous portion which provides for mechanical engagement of the rigid arrangement and the resiliently deformable body whereby the distal end of the second end section is liable to move within the distal end of the second end section. The rigid arrangement 62 is disposed within the resiliently deformable body 32 such that the rigid arrangement extends in three mutually orthogonal directions inside the resiliently deformable body. The rigid arrangement 62 is operative to anchor the permanent magnet 20 inside the resiliently deformable body and to allow a user to move the permanent magnet by deformation of the resiliently deformable body near part of the rigid arrangement spaced from the magnetic field emitting device. In another form, there is no bulbous portion at the distal end of the second end section. Instead there is a bulbous portion midway along the middle section whereby there is liable to be rotation of the rigid arrangement about the bulbous portion upon movement of an end of the rigid arrangement.

The invention claimed is:

1. Control apparatus comprising:
a mobile device comprising a magnetic field sensor;
a resiliently deformable body defining a narrow hole which receives the mobile device lengthwise or widthwise and holds the mobile device snugly when so received; and
a magnetic field emitting device disposed in or on the resiliently deformable body whereby, in use, upon deformation of the resiliently deformable body, the magnetic field emitting device of the resiliently deformable body moves relative to the mobile device held in the narrow hole, thereby the magnetic field emitting device moves relative to the magnetic field sensor of the mobile device, wherein the mobile device, when held in the narrow hole, senses movement of the magnetic field emitting device relative to the magnetic field sensor.

2. Control apparatus according to claim 1, wherein the mobile device senses change in orientation of the resiliently deformable body with reference to a predefined magnetic direction, change in orientation being sensed by the magnetic field sensor when the mobile device is held in the narrow hole.

3. Control apparatus according to claim 1, wherein the mobile device generates a control signal in dependence on sensing of movement of the magnetic field emitting device relative to the magnetic field sensor when the mobile device is held in the narrow hole.

4. Control apparatus according to claim 3, wherein the mobile device provides a user perceptible output in dependence on the control signal.

5. Control apparatus according to claim 1, wherein the narrow hole is of a depth relative to one of a length and a width of the mobile device whereby a part of the mobile device is held in the narrow hole when another part of the mobile device is outside the narrow hole.

6. Control apparatus according to claim 1, wherein at least one dimension of the narrow hole is sufficiently large to allow the mobile device to be inserted into the narrow hole and yet is sufficiently small that the resiliently deformable body defining the narrow hole bears against the outside of the mobile device when the mobile device is held in the narrow hole to thereby provide for mechanical coupling between the mobile device and the resiliently deformable body.

7. Control apparatus according to claim 1, wherein the resiliently deformable body is translucent at least in part whereby light emitted by a display comprised in the mobile device is seen by a user through the resiliently deformable body when the mobile device is held in the narrow hole.

8. Control apparatus according to claim 1, wherein a part of the resiliently deformable body which defines a surface of the narrow hole interacts with a touchscreen comprised in the mobile device upon deformation of the resiliently deformable body and when the mobile device is held in the narrow hole.

9. Control apparatus according to claim 8, wherein the resiliently deformable body comprises at least one of: a metallic arrangement on the surface of the narrow hole; and an electrically conductive polymer which defines the surface of the narrow hole.

10. Control apparatus according to claim 1, wherein the resiliently deformable body comprises a rigid arrangement to which the magnetic field emitting device is attached, the rigid arrangement being disposed within the resiliently deformable body to hold the magnetic field emitting device at a predetermined location in or on the resiliently deformable body.

11. Control apparatus according to claim 10, wherein the rigid arrangement extends in at least two orthogonal directions inside the resiliently deformable body.

12. Control apparatus according to claim 10, wherein the rigid arrangement pivots about a fulcrum between two opposite ends of the rigid arrangement.

13. Control apparatus according to claim 1, further comprising controllable apparatus, deformation of the resiliently deformable body when the mobile device is held in the narrow hole controlling the controllable apparatus in dependence on the mobile device sensing movement of the magnetic field emitting device relative to the magnetic field sensor.

14. Control apparatus according to claim 13, wherein the controllable apparatus comprises at least one of: a further mobile device; a home entertainment system; and a home automation system.

15. Control apparatus according to claim 1 in which the resiliently deformable body is formed as a toy.

16. Control apparatus according to claim 15, wherein an aperture is defined in an outside surface of the resiliently deformable body, the aperture opening into a side of the narrow hole to thereby provide for visibility from outside the resiliently deformable body of at least a part of a display of the mobile device when the mobile device is held in the narrow hole.

17. Control apparatus according to claim 16, wherein a further aperture is defined in the surface of the resiliently deformable body, the further aperture being located to allow for unobscured use of a camera comprised in the mobile device.

18. Control apparatus according to claim 15, further comprising a cover which fits over the resiliently deformable body, the cover comprising features whereby the toy constituted by the resiliently deformable body is given a particular character.

19. Control apparatus according to claim 18, wherein the cover comprises an identification device and the mobile device reads the identification device whereby the cover is identified by the mobile device and operation of the mobile device is changed in dependence on the cover being identified.

20. Control apparatus according to claim 15, wherein the mobile device responds to sensed movement of the magnetic field emitting device relative to the magnetic field sensor, the mobile device responding to the sensed movement in accordance with a character of the toy.

\* \* \* \* \*